United States Patent
Kwon et al.

(10) Patent No.: US 10,288,151 B2
(45) Date of Patent: May 14, 2019

(54) MULTI-STAGE TRANSMISSION

(71) Applicants: HYUNDAI MOTOR COMPANY, Seoul (KR); KIA MOTORS CORPORATION, Seoul (KR)

(72) Inventors: Hyun Sik Kwon, Seoul (KR); Seong Wook Hwang, Gunpo-si (KR); Ki Tae Kim, Incheon (KR); Won Min Cho, Hwaseong-si (KR); Jae Chang Kook, Hwaseong-si (KR); Seong Wook Ji, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/808,267

(22) Filed: Nov. 9, 2017

(65) Prior Publication Data
US 2019/0017575 A1    Jan. 17, 2019

(30) Foreign Application Priority Data
Jul. 12, 2017 (KR) ......................... 10-2017-0088405

(51) Int. Cl.
*F16H 3/66* (2006.01)
(52) U.S. Cl.
CPC ..... *F16H 3/663* (2013.01); *F16H 2200/0069* (2013.01); *F16H 2200/201* (2013.01); *F16H 2200/202* (2013.01); *F16H 2200/2012* (2013.01); *F16H 2200/2023* (2013.01); *F16H 2200/2046* (2013.01)

(58) Field of Classification Search
CPC ............ F16H 3/663; F16H 2200/0069; F16H 2200/201; F16H 2200/202; F16H 2200/2012; F16H 2200/2023; F16H 2200/2046
USPC ........ 475/275, 282, 283, 311, 312, 317, 330
See application file for complete search history.

(56) References Cited

U.S. PATENT DOCUMENTS

| | | | | |
|---|---|---|---|---|
| 4,357,840 A * | 11/1982 | Winzeler | ................ | B62D 11/08 475/205 |
| 4,513,634 A * | 4/1985 | Ohtsuka | .................. | F16H 3/663 475/54 |
| 4,625,588 A * | 12/1986 | Brickley | ............... | F16H 37/084 475/325 |
| 5,133,697 A * | 7/1992 | Hattori | .................... | F16H 3/663 475/276 |
| 7,018,319 B2 * | 3/2006 | Ziemer | ..................... | F16H 3/66 475/271 |

(Continued)

FOREIGN PATENT DOCUMENTS

KR    10-2013-0004392 A    1/2013

*Primary Examiner* — Leslie A Nicholson, III
(74) *Attorney, Agent, or Firm* — Brinks Gilson & Lione

(57) ABSTRACT

A multi-stage transmission is disclosed. The multi-stage transmission includes: two simple planetary gear sets, each including three rotary elements; one compound planetary gear set including four rotary elements; and six shifting elements. Since ten forward shifting stages and one reverse shifting stage can be accomplished with a relatively small number of parts, a simple construction and a low weight, the multi-stage transmission provides a further improved speed ratio for the driving conditions of the vehicle, thereby improving the fuel efficiency of the vehicle.

6 Claims, 2 Drawing Sheets

(56) References Cited

U.S. PATENT DOCUMENTS

Figure 1:
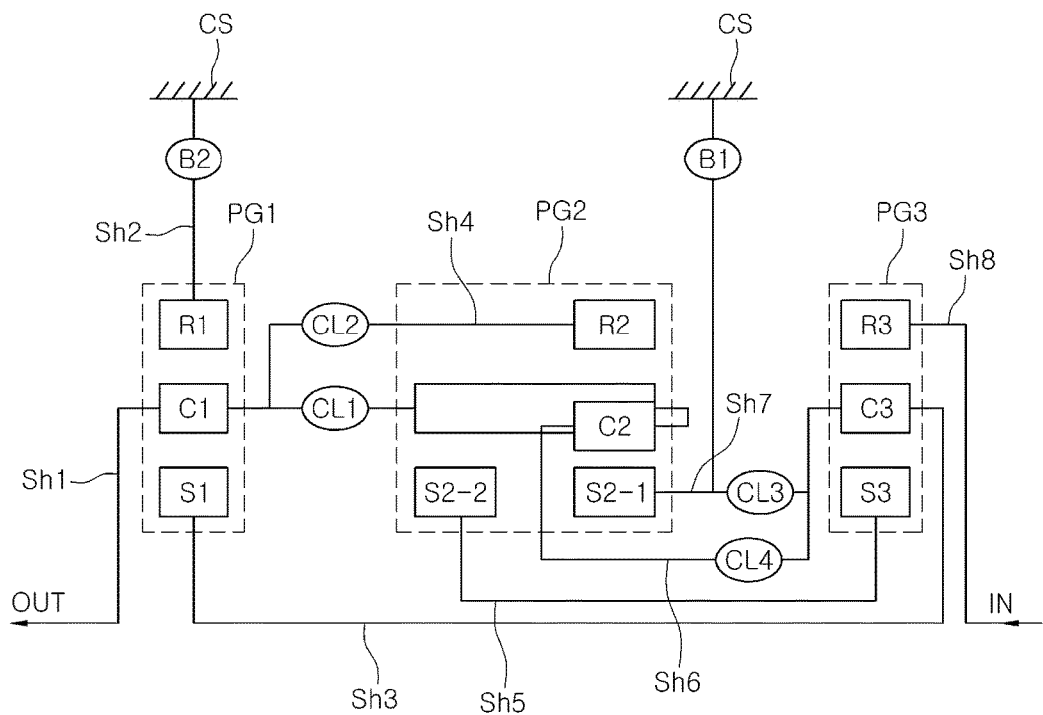

| | | | | |
|---|---|---|---|---|
| 7,125,360 | B2* | 10/2006 | Ziemer | F16H 3/663 475/284 |
| 7,175,562 | B2* | 2/2007 | Gumpoltsberger | F16H 3/666 475/276 |
| 7,186,204 | B2* | 3/2007 | Gumpoltsberger | F16H 3/666 475/275 |
| 7,824,302 | B2* | 11/2010 | Diosi | F16H 3/66 475/277 |
| 8,989,974 | B2* | 3/2015 | Arnold | F16H 61/68 701/51 |
| 9,382,981 | B2* | 7/2016 | Ogauchi | F16H 3/666 |
| 9,644,711 | B2* | 5/2017 | Cho | F16H 3/66 |
| 9,714,692 | B2* | 7/2017 | Kim | F16H 3/66 |
| 2017/0320386 | A1* | 11/2017 | Beck | B60K 6/365 |
| 2018/0031055 | A1* | 2/2018 | Kitamura | F16D 25/062 |
| 2018/0163823 | A1* | 6/2018 | Kook | F16H 3/66 |
| 2018/0297464 | A1* | 10/2018 | Beck | F16H 3/666 |

* cited by examiner

FIG. 2

| GEAR | B1 | B2 | CL1 | CL2 | CL3 | CL4 | GEAR RATIO |
|------|----|----|-----|-----|-----|-----|------------|
| 1ST  |    | ●  |     | ●   | ●   |     | 4.855      |
| 2ND  |    | ●  | ●   |     | ●   |     | 3.740      |
| 3RD  |    | ●  | ●   | ●   |     |     | 3.182      |
| 4TH  | ●  | ●  | ●   |     |     |     | 2.810      |
| 5TH  | ●  | ●  |     | ●   |     |     | 2.066      |
| 6TH  | ●  | ●  |     |     |     | ●   | 1.570      |
| 7TH  |    | ●  |     | ●   |     | ●   | 1.322      |
| 8TH  | ●  |    |     | ●   |     | ●   | 1.193      |
| 9TH  |    |    | ●   | ●   |     | ●   | 1.000      |
| 10TH | ●  |    | ●   |     |     | ●   | 0.628      |
| REV  | ●  |    |     | ●   | ●   |     | −1.570     |

MULTI-STAGE TRANSMISSION

CROSS-REFERENCE TO RELATED APPLICATION

This application claims the priority to and the benefit of Korean Patent Application No. 10-2017-0088405, filed on Jul. 12, 2017, which is incorporated herein by reference in its entirety.

FIELD

The present disclosure relates to a multi-stage transmission, and more particularly to a structure of a multi-stage transmission that is capable of providing various shifting stages.

BACKGROUND

The statements in this section merely provide background information related to the present disclosure and may not constitute prior art.

A vehicle is driven under various conditions such as stoppage, acceleration, deceleration, and the like. Therefore, a transmission of a vehicle needs to transmit power of an engine to driving wheels while performing gear shifting suitably for various driving conditions.

In particular, with increased demand for improved fuel efficiency of vehicles in many countries, the demand for highly efficient transmissions capable of improving the fuel efficiency of vehicles has increased. In order to meet this demand, there is a need to develop a transmission that has fewer parts and a simpler construction but that provides more shifting stages than the prior art.

The information disclosed in this Background of the Present disclosure section is only for enhancement of understanding of the general background of the present disclosure and should not be taken as an acknowledgement or any form of suggestion that this information forms the prior art already known to a person skilled in the art.

SUMMARY

The present disclosure provides a multi-stage transmission that is capable of accomplishing at least nine forward shifting stages and at least one reverse shifting stage with a relatively simple construction and a low weight, thereby contributing to improving the fuel efficiency of a vehicle.

In one form of the present disclosure, a multi-stage transmission may include: a first planetary gear set including first, second and third rotary elements, a second planetary gear set including first, second, third and fourth rotary elements, and a third planetary gear set including first, second and third rotary elements.

In particular, the first rotary element of the first planetary gear set is directly connected to the second rotary element of the third planetary gear set, the second rotary element of the first planetary gear set is directly connected to an output shaft, and the third rotary element of the first planetary gear set is mounted to be selectively fixed to a transmission case. And, the first rotary element of the second planetary gear set is mounted to be selectively fixed to the transmission case, the second rotary element of the second planetary gear set is directly connected to the first rotary element of the third planetary gear set, and the third rotary element and the fourth rotary element of the second planetary gear set are mounted to be selectively connected to the second rotary element of the first planetary gear set. The second rotary element of the third planetary gear set is mounted to be selectively connected to the first rotary element and the third rotary element of the second planetary gear set, and the third rotary element of the third planetary gear set is directly connected to an input shaft.

The first rotary element of the second planetary gear set may be mounted to be selectively fixed to the transmission case by a first brake, the third rotary element of the first planetary gear set may be mounted to be selectively fixed to the transmission case by a second brake, the third rotary element of the second planetary gear set may be mounted to be selectively connected to the second rotary element of the first planetary gear set by a first clutch, the fourth rotary element of the second planetary gear set may be mounted to be selectively connected to the second rotary element of the first planetary gear set by a second clutch, the second rotary element of the third planetary gear set may be mounted to be selectively connected to the first rotary element of the second planetary gear set by a third clutch, and the second rotary element of the third planetary gear set may be mounted to be selectively connected to the third rotary element of the second planetary gear set by a fourth clutch.

The first, second and third rotary elements of the first planetary gear set may be embodied as a first sun gear, a first carrier, and a first ring gear, respectively. The second planetary gear set may be embodied as a Ravigneaux-type compound planetary gear set. The first, second, third and fourth rotary elements of the second planetary gear set may be embodied as a second-first sun gear (2-$1^{st}$ sun gear), a second-second sun gear (2-$2^{nd}$ sun gear), a second carrier, and a second ring gear, respectively. The first, second and third rotary elements of the third planetary gear set may be embodied as a third sun gear, a third carrier, and a third ring gear, respectively.

The first planetary gear set, the second planetary gear set and the third planetary gear set may be sequentially arranged in an axial direction of the output shaft and the input shaft such that central axes thereof are aligned with each other.

In accordance with another aspect of the present disclosure, a multi-stage transmission may include: a first planetary gear set including first, second and third rotary elements; a second planetary gear set including first, second, third and fourth rotary elements; a third planetary gear set including first, second and third rotary elements; first, second, third, fourth, fifth, sixth, seventh and eighth rotary shafts each connected to a corresponding rotary element selected from the rotary elements of the planetary gear sets; a first brake mounted between the seventh rotary shaft and a transmission case; a second brake mounted between the second rotary shaft and the transmission case; a first clutch mounted between the first rotary shaft and the sixth rotary shaft; a second clutch mounted between the first rotary shaft and the fourth rotary shaft; a third clutch mounted between the third rotary shaft and the seventh rotary shaft; and a fourth clutch mounted between the third rotary shaft and the sixth rotary shaft.

In particular, the first rotary shaft is an output shaft directly connected to the second rotary element of the first planetary gear set, the second rotary shaft is directly connected to the third rotary element of the first planetary gear set, the third rotary shaft is directly connected to the first rotary element of the first planetary gear set and the second rotary element of the third planetary gear set, the fourth rotary shaft is directly connected to the fourth rotary element of the second planetary gear set, the fifth rotary shaft is directly connected to the second rotary element of the second planetary gear set and the first rotary element of the third planetary gear set, the sixth rotary shaft is directly connected to the third rotary element of the second planetary gear set, the seventh rotary shaft is directly connected to the first rotary element of the second planetary gear set, and the eighth rotary shaft is an input shaft directly connected to the third rotary element of the third planetary gear set.

The first rotary element of the first planetary gear set may be embodied as a first sun gear, the second rotary element of the first planetary gear set may be embodied as a first carrier, and the third rotary element of the first planetary gear set may be embodied as a first ring gear. The second planetary gear set may be embodied as a Ravigneaux-type compound planetary gear set. The first rotary element of the second planetary gear set may be embodied as a 2-$1^{st}$ sun gear, the second rotary element of the second planetary gear set may be embodied as a 2-$2^{nd}$ sun gear, the third rotary element of the second planetary gear set may be embodied as a second carrier, and the fourth rotary element of the second planetary gear set may be embodied as a second ring gear. The first rotary element of the third planetary gear set may be embodied as a third sun gear, the second rotary element of the third planetary gear set may be embodied as a third carrier, and the third rotary element of the third planetary gear set may be embodied as a third ring gear.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view illustrating the structure of a multi-stage transmission in one form of the present disclosure; and FIG. 2 is a table showing the operating modes of the transmission shown in FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a multi-stage transmission in one form of the present disclosure includes: a first planetary gear set PG1 including first to third rotary elements, a second planetary gear set PG2 including first to fourth rotary elements, and a third planetary gear set PG3 including first to third rotary elements.

The first rotary element S1 of the first planetary gear set PG1 is directly connected to the second rotary element C3 of the third planetary gear set PG3, the second rotary element C1 thereof is directly connected to an output shaft OUT, and the third rotary element R1 thereof is mounted to be selectively fixed to a transmission case CS.

The first rotary element S2-1 of the second planetary gear set PG2 is mounted to be selectively fixed to the transmission case CS, the second rotary element S2-2 thereof is directly connected to the first rotary element S3 of the third planetary gear set PG3, and the third rotary element C2 and the fourth rotary element R2 thereof are mounted to be selectively connected to the second rotary element C1 of the first planetary gear set PG1.

The second rotary element C3 of the third planetary gear set PG3 is mounted to be selectively connected to the first rotary element S2-1 and the third rotary element C2 of the second planetary gear set PG2, and the third rotary element R3 thereof is directly connected to an input shaft IN.

The first rotary element S2-1 of the second planetary gear set PG2 is mounted to be selectively fixed to the transmission case CS by a first brake B1. The third rotary element R1 of the first planetary gear set PG1 is mounted to be selectively fixed to the transmission case CS by a second brake B2. The third rotary element C2 of the second planetary gear set PG2 is mounted to be selectively connected to the second rotary element C1 of the first planetary gear set PG1 by a first clutch CL1. The fourth rotary element R2 of the second planetary gear set PG2 is mounted to be selectively connected to the second rotary element C1 of the first planetary gear set PG1 by a second clutch CL2. The second rotary element C3 of the third planetary gear set PG3 is mounted to be selectively connected to the first rotary element S2-1 of the second planetary gear set PG2 by a third clutch CL3. The second rotary element C3 of the third planetary gear set PG3 is mounted to be selectively connected to the third rotary element C2 of the second planetary gear set PG2 by a fourth clutch CL4.

Owing to the first brake B1 and the second brake B2, the first rotary element of the second planetary gear set PG2 and the third rotary element of the first planetary gear set PG1 are selectively connected to the transmission case CS so as to be selectively non-rotatable (when connected to the transmission case) or freely rotatable (when not connected to the transmission case).

The first brake B1, the second brake B2, the first clutch CL1, the second clutch CL2, the third clutch CL3, and the fourth clutch CL4 are controlled by a controller (not illustrated) in accordance with the operating modes, which are shown in the table of FIG. 2, so as to be suitable for the traveling conditions of the vehicle. The multi-stage transmission including the above-described components provides ten forward shifting stages and one reverse shifting stage.

Here, the controller may be implemented by at least one processor operated by a setting program, in which the setting program includes a series of commands for performing each operating mode included in the shifting control method according to the present disclosure to be described below Herein, the first brake B1, the second brake B2, the first clutch CL1, the second clutch CL2, the third clutch CL3 and the fourth clutch CL4 may be generally referred to as a "shifting element". The transmission in one exemplary form of the present disclosure, as shown in FIG. 2, is capable of performing clutch-to-clutch shifting, in which shifting from the first stage to the tenth stage is accomplished by disengaging a shifting element associated with a certain speed ratio and engaging a shifting element associated with another speed ratio.

The first rotary element of the first planetary gear set PG1 is embodied as a first sun gear S1, the second rotary element thereof is embodied as a first carrier C1, and the third rotary element thereof is embodied as a first ring gear R1. The second planetary gear set PG2 is embodied as a Ravigneaux-type compound planetary gear set. The first rotary element of the second planetary gear set PG2 is embodied as a second-first sun gear (2-$1^{st}$ sun gear) S2-1, the second rotary element thereof is embodied as a second-second sun gear (2-$2^{nd}$ sun gear) S2-2, the third rotary element thereof is embodied as a second carrier C2, and the fourth rotary element thereof is embodied as a second ring gear R2. The first rotary element of the third planetary gear set PG3 is embodied as a third sun gear S3, the second rotary element thereof is embodied as a third carrier C3, and the third rotary element thereof is embodied as a third ring gear R3.

The first planetary gear set PG1, the second planetary gear set PG2 and the third planetary gear set PG3 are sequentially arranged in the axial direction of the output shaft OUT and the input shaft IN such that the central axes thereof are aligned with each other.

The multi-stage transmission of the present disclosure may alternatively include a first planetary gear set PG1 including first to third rotary elements, a second planetary gear set PG2 including first to fourth rotary elements, a third planetary gear set PG3 including first to third rotary elements, and first to eighth rotary shafts Sh1 to Sh8 connected to the rotary elements of the planetary gear sets.

The first rotary shaft Sh1 is an output shaft OUT, which is directly connected to the second rotary element of the first planetary gear set PG1. The second rotary shaft Sh2 is directly connected to the third rotary element of the first planetary gear set PG1. The third rotary shaft Sh3 is directly connected to the first rotary element of the first planetary gear set PG1 and the second rotary element of the third planetary gear set PG3. The fourth rotary shaft Sh4 is directly connected to the fourth rotary element of the second planetary gear set PG2. The fifth rotary shaft Sh5 is directly connected to the second rotary element of the second planetary gear set PG2 and the first rotary element of the third planetary gear set PG3. The sixth rotary shaft Sh6 is directly connected to the third rotary element of the second planetary gear set PG2. The seventh rotary shaft Sh7 is directly connected to the first rotary element of the second planetary gear set PG2. The eighth rotary shaft Sh8 is an input shaft IN, which is directly connected to the third rotary element of the third planetary gear set PG3.

Further, a first brake B1 is mounted between the seventh rotary shaft Sh7 and the transmission case CS. A second brake B2 is mounted between the second rotary shaft Sh2 and the transmission case CS. A first clutch CL1 is mounted between the first rotary shaft Sh1 and the sixth rotary shaft Sh6. A second clutch CL2 is mounted between the first rotary shaft Sh1 and the fourth rotary shaft Sh4. A third clutch CL3 is mounted between the third rotary shaft Sh3 and the seventh rotary shaft Sh7. A fourth clutch CL4 is mounted between the third rotary shaft Sh3 and the sixth rotary shaft Sh6.

As described above, the multi-stage transmission of the present disclosure, which is constituted by two simple planetary gear sets, one compound planetary gear set and six shifting elements, accomplishes ten forward shifting stages and one reverse shifting stage in accordance with the operating modes shown in the table of FIG. 2. Since multiple shifting stages, namely ten shifting stages, can be accomplished with a relatively small number of parts, a simple construction and a low weight, the multi-stage transmission of the present disclosure provides a further improved speed ratio for the driving conditions of the vehicle, thereby improving the fuel efficiency of the vehicle.

The present disclosure provides a multi-stage transmission that is capable of accomplishing at least ten forward shifting stages and at least one reverse shifting stage with a relatively simple construction and a low weight, thereby contributing to improving the fuel efficiency of a vehicle.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A multi-stage transmission, comprising:
    a first planetary gear set including first, second and third rotary elements;
    a second planetary gear set including first, second, third and fourth rotary elements; and
    a third planetary gear set including first, second and third rotary elements,
    wherein the first rotary element of the first planetary gear set is directly connected to the second rotary element of the third planetary gear set, the second rotary element of the first planetary gear set is directly connected to an output shaft, and the third rotary element of the first planetary gear set is mounted to be selectively fixed to a transmission case,
    wherein the first rotary element of the second planetary gear set is mounted to be selectively fixed to the transmission case, the second rotary element of the second planetary gear set is directly connected to the first rotary element of the third planetary gear set, and the third rotary element and the fourth rotary element of the second planetary gear set are mounted to be selectively connected to the second rotary element of the first planetary gear set, and
    wherein the second rotary element of the third planetary gear set is mounted to be selectively connected to the first rotary element and the third rotary element of the second planetary gear set, and the third rotary element of the third planetary gear set is directly connected to an input shaft.

2. The multi-stage transmission according to claim 1, wherein the first rotary element of the second planetary gear set is mounted to be selectively fixed to the transmission case by a first brake, the third rotary element of the first planetary gear set is mounted to be selectively fixed to the transmission case by a second brake, the third rotary element of the second planetary gear set is mounted to be selectively connected to the second rotary element of the first planetary gear set by a first clutch, the fourth rotary element of the second planetary gear set is mounted to be selectively connected to the second rotary element of the first planetary gear set by a second clutch, the second rotary element of the third planetary gear set is mounted to be selectively connected to the first rotary element of the second planetary gear set by a third clutch, and the second rotary element of the third planetary gear set is mounted to be selectively connected to the third rotary element of the second planetary gear set by a fourth clutch.

3. The multi-stage transmission according to claim 2, wherein the first, second and third rotary elements of the first planetary gear set are respectively embodied as a first sun gear, a first carrier, and a first ring gear,
    wherein the second planetary gear set is embodied as a Ravigneaux-type compound planetary gear set, and
    the first, second, third and fourth rotary elements of the second planetary gear set are respectively embodied as a second-first sun gear (2-$1^{st}$ sun gear), a second-second sun gear (2-$2^{nd}$ sun gear), a second carrier, and a second ring gear, and
    wherein the first, second and third rotary elements of the third planetary gear set are respectively embodied as a third sun gear, a third carrier, and a third ring gear.

4. The multi-stage transmission according to claim 3, wherein the first planetary gear set, the second planetary gear set and the third planetary gear set are sequentially arranged in an axial direction of the output shaft and the input shaft such that central axes thereof are aligned with each other.

5. A multi-stage transmission comprising:
- a first planetary gear set including first, second and third rotary elements;
- a second planetary gear set including first, second, third and fourth rotary elements;
- a third planetary gear set including first, second and third rotary elements;
- first, second, third, fourth, fifth, sixth, seventh and eighth rotary shafts each connected to a corresponding rotary element selected from the rotary elements of the first, second and third planetary gear sets;
- a first brake mounted between the seventh rotary shaft and a transmission case;
- a second brake mounted between the second rotary shaft and the transmission case;
- a first clutch mounted between the first rotary shaft and the sixth rotary shaft;
- a second clutch mounted between the first rotary shaft and the fourth rotary shaft;
- a third clutch mounted between the third rotary shaft and the seventh rotary shaft; and
- a fourth clutch mounted between the third rotary shaft and the sixth rotary shaft,
- wherein the first rotary shaft is an output shaft directly connected to the second rotary element of the first planetary gear set, the second rotary shaft is directly connected to the third rotary element of the first planetary gear set, the third rotary shaft is directly connected to the first rotary element of the first planetary gear set and the second rotary element of the third planetary gear set, the fourth rotary shaft is directly connected to the fourth rotary element of the second planetary gear set, the fifth rotary shaft is directly connected to the second rotary element of the second planetary gear set and the first rotary element of the third planetary gear set, the sixth rotary shaft is directly connected to the third rotary element of the second planetary gear set, the seventh rotary shaft is directly connected to the first rotary element of the second planetary gear set, and the eighth rotary shaft is an input shaft directly connected to the third rotary element of the third planetary gear set.

6. The multi-stage transmission according to claim 5, wherein the first, second and third rotary elements of the first planetary gear set are respectively embodied as a first sun gear, a first carrier, and a first ring gear,
- wherein the second planetary gear set is embodied as a Ravigneaux-type compound planetary gear set, and
- the first, second, third and fourth rotary elements of the second planetary gear set are respectively embodied as a $2\text{-}1^{st}$ sun gear, a $2\text{-}2^{nd}$ sun gear, a second carrier, and a second ring gear, and
- wherein the first, second and third rotary elements of the third planetary gear set are respectively embodied as a third sun gear, a third carrier, and a third ring gear.

* * * * *